(12) United States Patent
Meier et al.

(10) Patent No.: US 6,269,416 B1
(45) Date of Patent: Jul. 31, 2001

(54) ADAPTIVE PCI SLOT

(75) Inventors: Matthias Meier, Roseville, CA (US); Samuel M. Babb; Scott P. Allan, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/245,509

(22) Filed: Feb. 2, 1999

(51) Int. Cl.[7] ....................................... G06F 13/00
(52) U.S. Cl. ............................. 710/102; 710/103
(58) Field of Search ................................. 710/100, 101, 710/102, 103, 104, 105, 129

(56) References Cited

U.S. PATENT DOCUMENTS

| | | | |
|---|---|---|---|
| 5,568,610 | * 10/1996 | Brown | 714/48 |
| 5,758,171 | * 5/1998 | Ramamurthy et al. | 713/300 |
| 5,781,748 | * 7/1998 | Santos et al. | 710/128 |
| 5,812,797 | * 9/1998 | Crane, Jr. et al. | 710/126 |
| 5,911,050 | * 6/1999 | Egan et al. | 361/58 |
| 5,930,496 | * 7/1999 | MacLaren et al. | 439/55 |

\* cited by examiner

Primary Examiner—Ario Etienne (57) ABSTRACT

A computer system includes a first power rail having a first voltage level, such as 5 volts, and a second power rail having a second voltage level, such as 3.3 volts. A PCI connector receives a first type PCI card having I/O buffers operable at the first voltage level or receives a second type PCI card having adaptable I/O buffers operable at the first voltage level or the second voltage level. The PCI connector includes voltage I/O pins for supplying power to the I/O buffers. Sensing circuitry provides a sense signal having a first state when the first type PCI card is inserted and having a second state when the second type PCI card is inserted. Switching circuitry is responsive to the sense signal at the first state to provide the first voltage level on the voltage I/O pins and is responsive to the sense signal at the second state to provide the second voltage level on the voltage I/O pins.

22 Claims, 6 Drawing Sheets

ADAPTIVE PCI SLOT

FIELD OF THE INVENTION

The present invention generally relates to peripheral component interconnect (PCI) systems for computer systems, and more particularly to adaptive PCI slots for accepting PCI cards to couple external devices to a microprocessor in a computer system.

BACKGROUND OF THE INVENTION

A computer system typically includes a peripheral component interconnect (PCI) system to interconnect one or more microprocessors with attached external devices. A PCI system includes PCI slots which are disposed in the computer system to be externally accessible so that PCI cards can be inserted therein. Compatible external devices can be plugged into the PCI cards. PCI cards are one type of expansion card. Each PCI slot typically includes a PCI connector and a PCI controller to control the PCI connector and to generate a PCI clock.

The PCI standard specification defines separate expansion PCI connectors for 5-volt signaling and 3.3-volt signaling environments. A location of a physical key in the PCI connector controls which type of signaling environment is to be employed in the PCI system. 5-volt only PCI cards only physically fit into a PCI connector keyed for 5-volt signaling. Similarly, 3.3-volt only PCI cards only physically fit into a PCI connector keyed for 3.3-volt signaling. A third type of PCI card is a universal card which can physically fit into a connector keyed for 5-volt or 3.3-volt signaling. The universal card is designed to adapt to the signaling environment of the PCI connector.

According to the PCI standard specification, the 5-volt signaling environment allows a maximum clock rate of 33 MHz, and the 3.3-volt signaling environment allows a maximum clock rate of 66 MHz. Therefore, conventional computer systems which support 5-volt only (33 MHz) and universal (33 or 66 MHz) PCI cards, must include 5-volt keyed PCI connectors for 33 MHz operation and 3.3-volt keyed PCI connectors for 66 MHz operation. The input/output (I/O) throughput of a computer system is limited by the number of PCI slots in the computer system that can be configured into the computer system's form factor design and the maximum frequency and maximum data width operation of the PCI slots. Thus, there is a high demand for a maximum number of high-performance PCI slots which operate at 66 MHz and can handle 64 bit transfer operations. The more high performance 66 MHz/64 bit PCI slots accommodated into the computer system maximizes the I/O bandwidth potential of the computer system. Nevertheless, many computer systems must also accommodate 5-volt only PCI cards which only operate up to 33 MHz. Conventional computer systems that include 3.3-volt type slots and 5-volt type slots degrade both performance and connectivity.

For reasons stated above and for other reasons presented in greater detail in the Description of the Preferred Embodiments section of the present specification, a computer system is desired which accommodates 5-volt only type PCI cards operating at 33 MHz and universal type PCI cards operating at 66 MHz in the same type PCI slots.

SUMMARY OF THE INVENTION

The present invention provides a computer system including a first power rail having a first voltage level and a second power rail having a second voltage level. A PCI connector is capable of receiving a first type PCI card having input/output (I/O) buffers operable at the first voltage level. The PCI connector is also capable of receiving a second type PCI card having adaptable I/O buffers operable at the first voltage level or the second voltage level. The PCI connector includes voltage I/O pins for supplying power to the I/O buffers in a PCI card inserted in the PCI connector. Sensing circuitry senses which type of PCI card is inserted in the PCI connector and provides a sense signal having a first state when the first type PCI card is inserted in the PCI connector and having a second state when the second type PCI card is inserted in the PCI connector. Switching circuitry is coupled to the first and second power rails and is responsive to the sense signal being at the first state to provide the first voltage level on the voltage I/O pins. The switching circuitry is responsive to the sense signal being at the second state to provide the second voltage level on the voltage I/O pins.

In one embodiment, the PCI connector includes at least one sensing pin which is grounded when the first type PCI card is inserted in the PCI connector and is left open when the second type PCI card is inserted in the PCI connector. The sensing circuitry is coupled to the at least one sensing pin and is responsive to the at least one sensing pin being grounded to provide the sense signal at the first state. The sensing circuitry is responsive to the at least one sensing pin being left open to provide the sense signal at the second state.

In one embodiment, the first type PCI card operates up to a first frequency. The second type PCI card operates up to the first frequency when its I/O buffers operate at the first voltage level and operates up to a second frequency which is higher than the first frequency when its I/O buffers operate at the second voltage level. The PCI connector includes a sensing pin which is grounded when the PCI card inserted in the PCI connector is capable of operating up to the first frequency and is left open when the PCI card inserted in the PCI connector is capable of operating up to the second frequency which is higher than the first frequency. The sensing circuitry is coupled to the sensing pin and is responsive to the sensing pin being grounded to provide the sense signal at the first state. The sensing circuitry is responsive to the sensing pin being left open to provide the sense signal at the second state.

In one embodiment, the switching circuitry includes a system readable register for storing the state of the sense signal and a system writable register for providing a SETVIO signal for controlling the voltage level on the voltage I/O pins. The computer system includes a microprocessor for reading the system readable register and for writing the system writable register. A clock generator provides a clock signal which is controllable to have a frequency of either a first clock frequency or a second clock frequency. The microprocessor controls the clock generator to provide the clock signal at the first clock frequency. The microprocessor writes a first register state into the system writable register so that the system writable register provides the SETVIO signal at a first SETVIO state. The PCI connector is then powered on. The microprocessor reads the state of the system readable register. If the state of the system readable register indicates that the sense signal is at the first state, the PCI card is connected to the computer system and initialized. If the state of the system readable register indicates that the sense signal is at the second state, the microprocessor performs the following steps: power off the PCI connector; write a second register state into the system writable register so that the system writable register provides the SETVIO signal at a second SETVIO state; control the clock generator to provide the clock signal at the second clock frequency; power on the PCI connector; and connect the PCI card to the computer system and initialize the PCI card.

In one embodiment, the switching circuitry includes a first transistor having a gate, a second transistor having a gate, and control circuitry. The first transistor is coupled between the first power rail and the voltage I/O pins. The second transistor is coupled between the second power rail and the voltage I/O pins. The control circuitry receives the sense signal and controls the gate of the first transistor and the gate of the second transistor.

In one form of the previous embodiment, the computer system includes a hot-plug controller for controlling the first and second power rails and providing a gate bias signal for controlling the power-on of the PCI connector. The control circuitry is responsive to the gate bias signal for controlling the gates of the first and second transistors. The gate bias signal is in at a first gate voltage level when the PCI connector is powered-off and is ramped up to a second gate voltage level to power-on the PCI connector. The control circuitry responds to the gate bias signal being at the second gate voltage level to cause either the first transistor or the second transistor to switch on depending on the state of the sense signal.

In another form of the previous embodiment, the computer system include a third power rail having a third voltage level. The control circuitry is coupled to the third power rail. The third voltage level controls the gates of the first and second transistors.

In one embodiment, the PCI connector includes a connector key portion corresponding to a first type card key portion. The first type PCI card includes the first type card key portion. The second type PCI card includes the first type card key portion and a second type card key portion.

The computer system according to the present invention includes adaptable PCI slots which accommodate the first type PCI cards, such as 5-volt only PCI cards, operating at the first frequency, such as 33 MHz, and also accommodate the second type PCI cards, such as universal type PCI cards operating at the second frequency, such as 66 MHz. The adaptable PCI slots allow for maximum I/O bandwidth in the computer system. In addition, the adaptable PCI slots permit the user of the computer system to customize every PCI slot of the computer system with either 5-volt only (33 MHz) PCI cards or universal (33 or 66 MHz) PCI cards.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
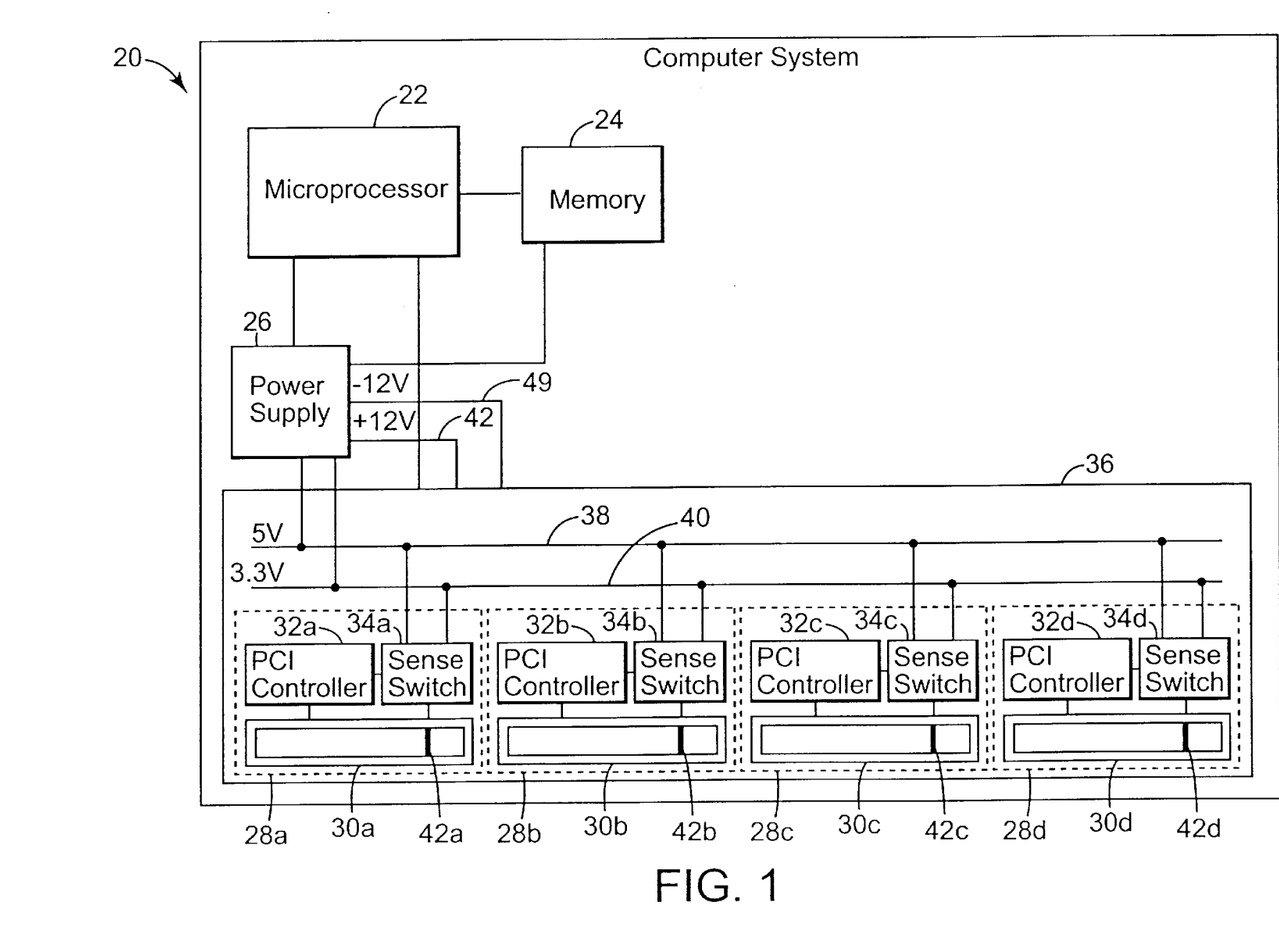
FIG. 1 is a block diagram of a computer system incorporating adaptive PCI slots according to the present invention.

A computer system 20 according to the present invention is illustrated at 20 in FIG. 1 in block diagram form. Computer system 20 includes a microprocessor 22 for performing sequences of logical operations. Computer system 20 also includes memory 24 for storing instructions and data for use by microprocessor 22. Memory 24 typically includes random access memory (RAM), non-volatile memory, and a hard disk drive, but can include any known type of memory storage. A power supply 26 supplies regulated voltage power to devices in computer system 20, such as microprocessor 22 and memory 24.

Computer system 20 includes a number of peripheral component interconnect (PCI) slots, such as indicated at 28a, 28b, 28c, and 28d. Each PCI slot 28 includes a PCI connector, such as indicated at 30a, 30b, 30c, and 30d. In the embodiment of computer system 20 illustrated in FIG. 1, each PCI slot 28 includes an individual PCI controller, such as indicated at 32a, 32b, 32c, and 32d. In one embodiment, each PCI controller 32 generates a PCI clock of 33 MHz and/or 66 MHz for its corresponding PCI connector 30.

Each PCI slot 28 also includes sensing and switching circuitry, such as indicated at 34a, 34b, 34c, and 34d. In one embodiment of the present invention, sensing and switching circuitries 34a–d are implemented on a PCI back plane 36. Power supply 26 provides regulated voltage power to a 5-volt power rail 38, a 3.3-volt power rail 40, a +12-volt power rail 42, and a –12-volt power rail 44. Each sensing and switching circuitry 34 senses whether a 5-volt only type PCI card or a universal type PCI card is inserted in a corresponding PCI connector 30, and based on this determination properly switches either the 5-volt regulated voltage from power rail 38 or the 3.3-volt regulated voltage from power rail 40 to its corresponding PCI connector 30.

Figure 2A:
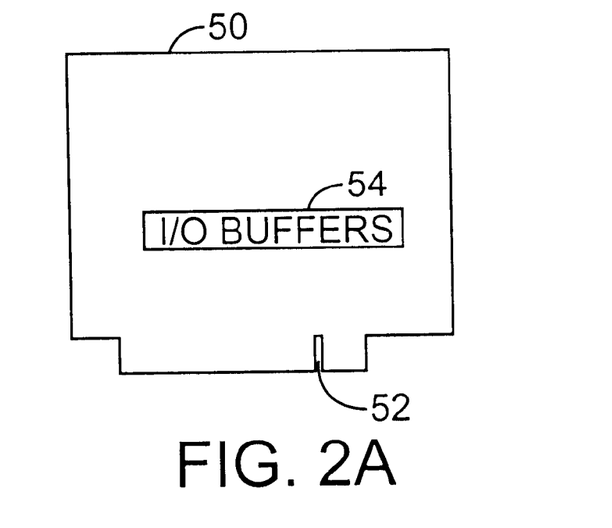
FIG. 2A is a illustration of a 5-volt only PCI card.

Each PCI connector 30 includes a key portion, such as indicated at 42a, 42b, 42c, and 42d. As illustrated in FIG. 1, each key portion 42 is constructed to receive 5-volt only PCI cards or universal type PCI cards. An example 5-volt only PCI card is illustrated in FIG. 2A at 50. 5-volt only PCI card 50 includes a key portion 52 which corresponds to key portion 42 of each PCI connector 30 of computer system 20 so that each PCI connector 30 is capable of receiving the 5-volt only type PCI card 50. 5-volt only PCI card 50 includes I/O buffers 54 which operate at a 5-volt level.

Figure 2B:
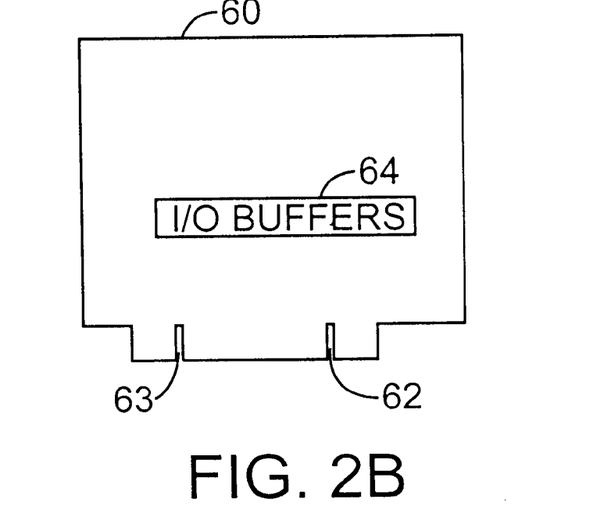
FIG. 2B is an illustration of a universal type PCI card.

A universal type PCI card 60 is illustrated in FIG. 2B. Universal type PCI card 60 includes a key portion 62 which corresponds to key portion 42 of each PCI connector 30 of computer system 20 to permit PCI connector 30 to receive universal type PCI card 60. In addition, universal type PCI card 60 includes a key portion 63 which would permit a 3-volt PCI connector to receive universal PCI card 60. Universal type PCI card 60 includes adaptable I/O buffers 64 which operate at a 5-volt level or a 3.3-volt level.

As discussed in the Background of the Invention section of the present specification, the PCI standard specification requires that 5-volt signaling environments allows a maximum clock rate of 33 MHz, and 3.3 volt signaling environments allow a maximum clock rate of 66 MHz. Sensing and switching circuitry 34 senses whether a 5-volt only type PCI card 50 or a universal type PCI card 60 is inserted into PCI connector 30. Sensing and switching circuitry 34 then provides 5 volts from the 5-volt power rail 38 to I/O buffers 54 of an inserted 5-volt only type PCI card 50 or provides 3.3 volts from the 3.3-volt power rail 40 to I/O buffers 64 of an inserted universal type PCI card 60.

Figure 3:
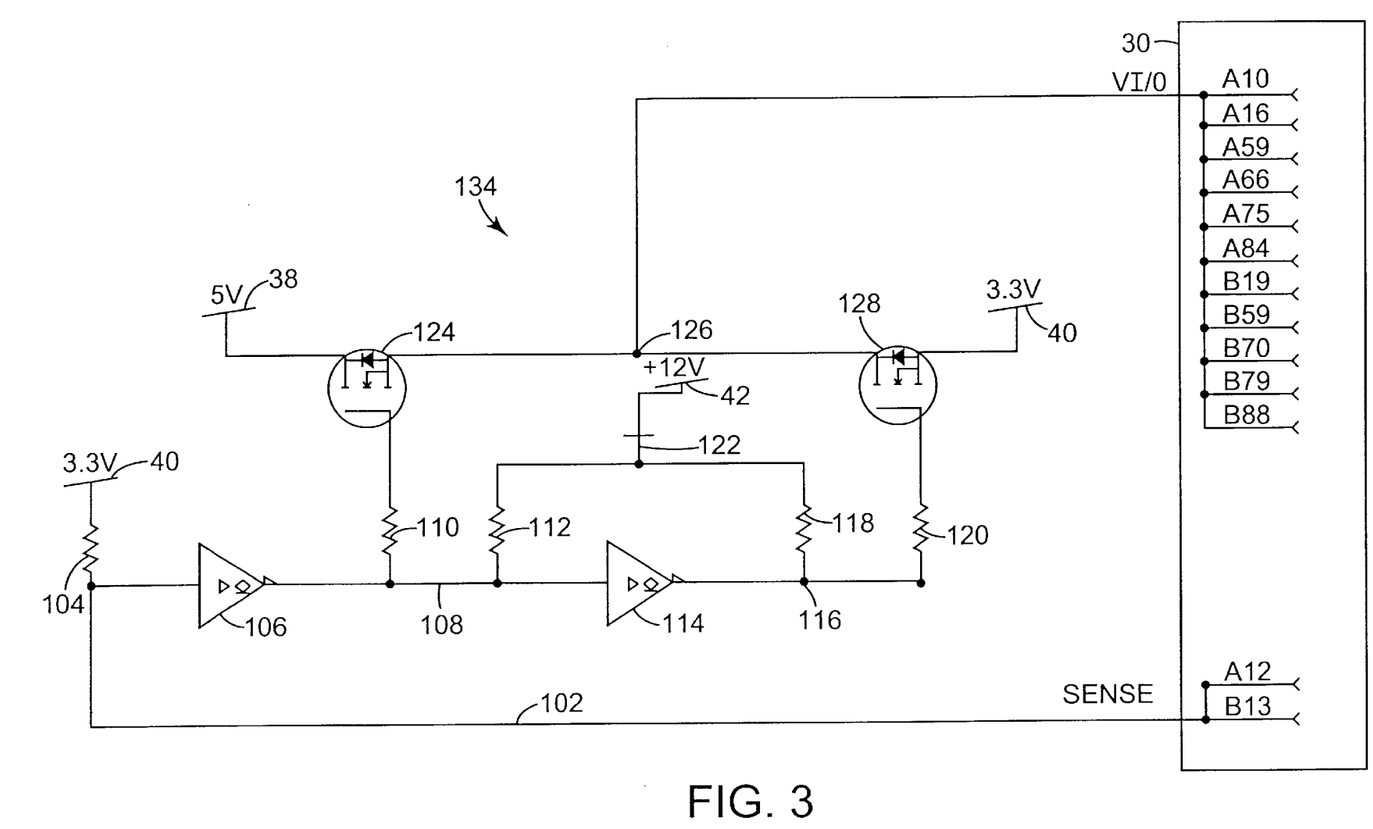
FIG. 3 is a schematic diagram illustrating sensing and switching circuitry according to the present invention which can be employed in the computer system of FIG. 1.

One embodiment of sensing and switching circuitry according to the present invention is illustrated generally at 134 in FIG. 3 in schematic diagram form. Sensing and switching circuitry 134 is coupled to PCI connector 30. For clarity only certain pin numbers of PCI connector 30 are shown in FIG. 3. The pin numbers that are shown are the actual pin numbers as designated by the PCI standard specification. In one embodiment, PCI connector 30 includes 188 pins for receiving a 5-volt only type PCI card 50 or a universal type PCI card 60 and for transmitting up to 64 bits of data. The inserted PCI card transmits address and data signals on the same pins by sending an address on one clock cycle and data on the next clock cycle. Burst data can be transmitted by starting with an address on a first clock cycle and providing data transmission on a sequence of successive clock cycles.

The sensing mechanism utilized by sensing and switching circuitry 134 requires that at least one ground pin on PCI connector 30 be converted into a sense pin. In one embodiment, two ground pins A12 and B13 of connector 30 are utilized for redundancy and are converted into sense pins as described in more detail below. According to the PCI standard specification, a 5-volt only type PCI card is required to short pins A12 and B13 to ground, and a universal type PCI card is required to leave pins A12 and B13 open. PCI connector 30 includes voltage I/O pins A10, A16, A59, A66, A75, A84, B19, B59, B70, B79, and B88 which supply power to I/O buffers in a PCI card inserted in PCI connector 30.

Converted sense pins A12 and B13 are coupled to a sense signal on a line 102. The sense signal on line 102 is coupled to a first terminal of a pull up resistor 104 and an input of an inverter 106. A second terminal of pull up resistor 104 is coupled to the 3.3-volt power rail 40. In one embodiment, inverter 106 comprises an open-collector/open-drain transistor, such as a small-signal N-channel field affect transistor (NET). The output of inverter 106 is coupled to a node 108. Node 108 is coupled to a first terminal of a resistor 110, a first terminal of a resistor 112, and an input to an inverter 114. Inverter 114 is preferably the same type of inverter as inverter 106, such as an open-collector/open-drain small-signal NFET inverter. The output of inverter 114 is coupled to a node 116. Node 116 is coupled to a first terminal of a resistor 118 and a first terminal of a resistor 120. A gate bias signal on a line 122 is provided to a second terminal of resistor 112 and a second terminal of resistor 118. A power NFET 124 has a source coupled to a node 126, a drain coupled to the 5-volt power rail 38, and a gate coupled to a second terminal of resistor 110. A power NFET 128 has a source coupled to the 3.3-volt power rail 40, a drain coupled to node 126, and a gate coupled to a second terminal of resistor 120. Node 126 is coupled to voltage I/O pins A10, A16, A59, A66, A75, A84, B19, B59, B70, B79, and B88 of connector 30.

In operation, as long as the gate bias signal on line 122 is below the threshold level of power NFETs 124 and 128, both NFETs 124 and 128 are off, and no power is applied to node 126 from either the 5-volt power rail 38 or the 3.3-volt power rail 40. Therefore, as long as the gate bias signal on line 122 is below the threshold level of power NFETs 124 and 128, no power is applied to the voltage I/O pins of connector 30. In a PCI Hot-Plug environment, which is described in more detail below, the gate bias signal on line 122 is controlled. In a non-hot-plug environment, as illustrated in FIG. 3, the gate bias signal on line 122 does not need to be controlled. Therefore, in one embodiment, the gate bias signal on line 122 is coupled to a fixed regulated voltage supply rail provided from power supply 26, where the fixed voltage from the supply rail provides sufficient gate voltage to power NFETs 124 and 128 to cause NFETs 124 and 128 to reach saturation. For example, a +12 voltage level is sufficient to cause NFETs 124 and 128 to reach saturation, and in the embodiment illustrated in FIG. 3, the gate bias signal on line 122 is coupled to the +12-volt power rail 42.

A 5-volt only PCI card 50 inserted into PCI connector 30 shorts converted sense pins A12 and B13 to ground, which forces the sense signal on line 102 to ground. If the gate bias signal on line 122 is equal to +12-volts, and the sense signal on line 102 is at a ground level, the output of inverter 106 at node 108 is floating. Assuming that there is no input current to inverter 114 the +12 volts of the gate bias signal on line 122 appears at the gate of power NFET 124. The +12 volts at the gate of power NFET 124 turns on NFET 124, which switches the 5 volts from 5-volt power rail 38 to node 126 to provide 5 volts to the voltage I/O pins A10, A16, A59, A66, A75, A84, B19, B59, B70, B79, and B88 of connector 30. With the input of inverter 114 high, its output at node 116 is pulled to a ground voltage level. Thus, the gate of power NFET 128 is also pulled to ground. With its gate at a ground level, power NFET 128 is off. In this way, the 3.3 volt supply of 3.3-volt power rail 40 is isolated from the voltage I/O pins of connector 30 when a 5-volt type PCI card is inserted into connector 30.

When a universal type PCI card is inserted into PCI connector 30, as mentioned above, converted sense pins A12 and B13 are open, but pull up resistor 104 ensures that the sense signal on line 102 is pulled to the 3.3 volt level of 3.3-volt power rail 40. In this case, the output of inverter 106 pulls node 108 to ground, and the output of inverter 114 is floating at node 116. Thus, power NFET 128 is on, which switches the 3.3 volts from 3.3-volt power rail 40 to node 126 to provide 3.3 volts to voltage I/O pins A10, A16, A59, A66, A75, A84, B19, B59, B70, B79, and B88 of connector 30. With node 108 at a ground level, power NFET 124 is off, which isolates the 5 volts of 5-volt power rail 38 from the voltage I/O pins of connector 30 when a universal type PCI card is inserted into connector 30.

Figure 4:
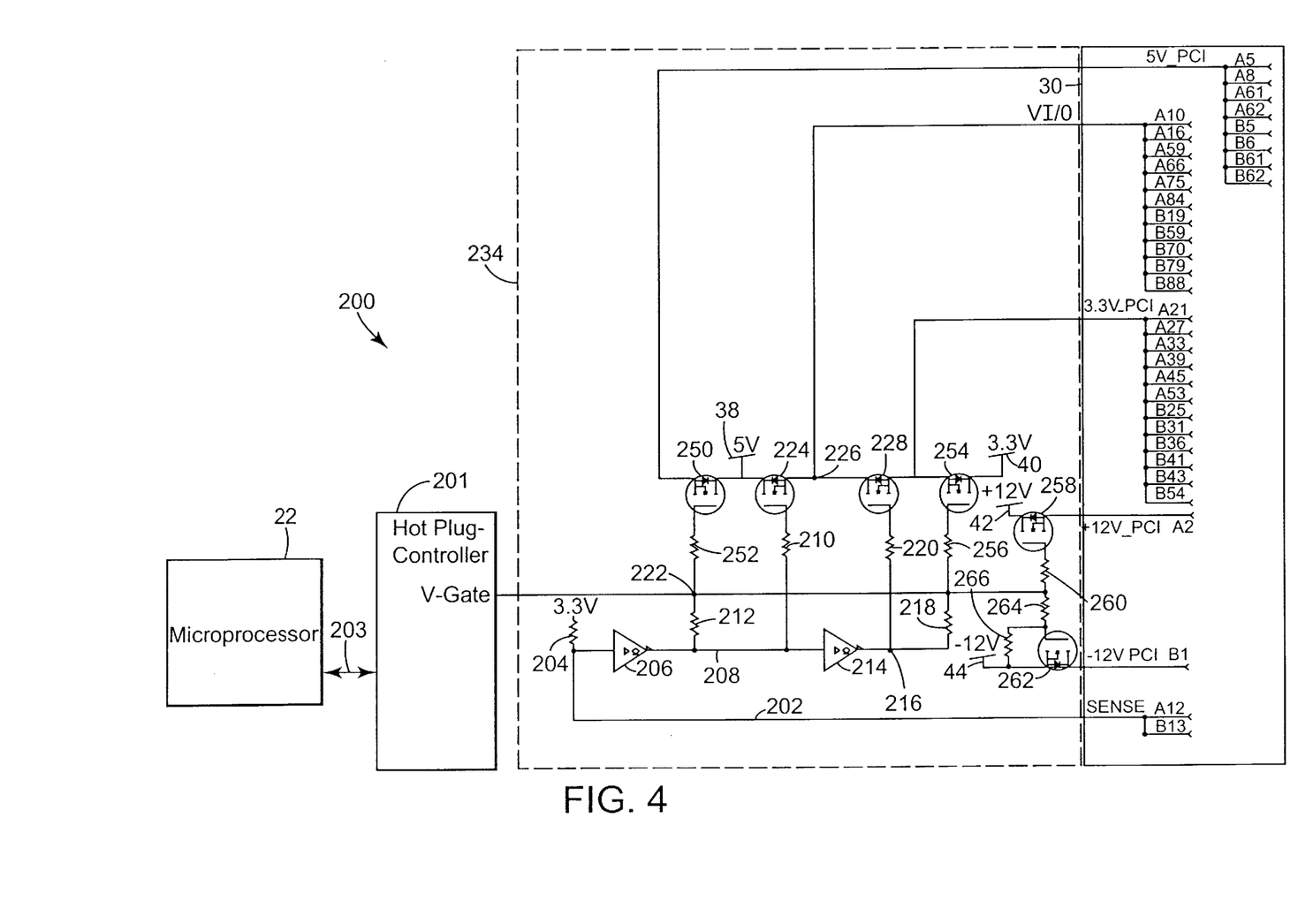
FIG. 4 is a schematic and block diagram of a Hot-Plug slot according to the present invention which can be employed in a computer system of FIG. 1.

A PCI Hot-Plug slot 200 according to the present invention is illustrated generally at 200 in FIG. 4. PCI Hot-Plug slot 200 includes sensing and switching circuitry 234 according to the present invention for operating in a PCI Hot-Plug environment. PCI Hot-Plug slot 200 also includes a Hot-Plug controller 201. In one embodiment, Hot-Plug controller 201 is implemented in an integrated circuit that switches PCI power rails and monitors each power rail for over current and under voltage conditions. Hot-Plug controller 201 is a conventional Hot-Plug controller which communicates with microprocessor 22 via control and status signals provided on lines 203. Some existing Hot-Plug controllers integrate switches for +12-volt and −12-volt switching, but the embodiment of Hot-Plug controller 201 illustrated in FIG. 4 does not perform the actual power rail switching, rather all power rails including the +12-volt and −12-volt power rails are switched externally.

As in FIG. 3, for clarity, only certain pin numbers of PCI connector 30 are shown in FIG. 4. Again, the shown pin numbers are the actual pin numbers as designated by the PCI standard specification. The sensing mechanism utilized by sensing and switching circuitry 234 requires that at least one ground pin on PCI connector 30 be converted into a sense pin. In the embodiment illustrated in FIG. 4, two ground pins A12 and B13 of connector 30 are utilized for redundancy and are converted into sense pins similar to sensing and switching circuitry 134 of FIG. 3.

Converted sense pins A12 and B13 are coupled to a sense signal on a line 202. The sense signal on line 202 is coupled to a first terminal of a pull up resistor 204 and an input of an inverter 206. A second terminal of pull up resistor 204 is coupled to the 3.3-volt power rail 40. In one embodiment, inverter 206 comprises an open-collector/open-drain transistor, such as a small-signal NFET. The output of inverter 206 is coupled to a node 208. Node 208 is coupled to a first terminal of a resistor 210, a first terminal of a resistor 212, and an input of an inverter 214. Inverter 214 is preferably the same type of inverter as inverter 206, such as an open-collector/open-drain small-signal NFET inverter. The output of inverter 214 is coupled to a node 216. Node 216 is coupled to a first terminal of a resistor 218 and a first terminal of a resistor 220.

A gate bias signal on a line 222 is provided to a second terminal of resistor 212 and a second terminal of resistor 218. A power NFET 224 has a source coupled to node 226, a drain coupled to the 5-volt power rail 38, and a gate coupled to a second terminal of resistor 210. A power NFET 228 has a source coupled to the 3.3-volt power rail 40, a drain coupled to node 226, and a gate coupled to a second terminal of resistor 220. Node 226 is coupled to voltage I/O pins A10, A16, A59, A66, A75, A84, B19, B59, B70, B79, and B88 of connector 30 which supply power to I/O buffers in a PCI card inserted in PCI connector 30.

Hot-Plug controller 201 provides a VGATE signal on line 222 as the gate bias signal. Thus, sensing and switching circuitry 234 differs from sensing and switching circuitry 134 of FIG. 3 in that the gate bias signal on line 222 is controlled by Hot-Plug controller 201 rather than being at a fixed voltage level. The added circuitry controlled by Hot-Plug controller 201 via the $V_{GATE}$ signal is coupled as follows. A power NFET 250 has a source coupled to 5-volt PCI pins A5, A8, A61, A62, B5, B6, B61, and B62 of connector 30. Power NFET 250 has a drain coupled to the 5-volt power rail 38. A resistor 252 is coupled between the gate bias signal on line 222 and a gate of power NFET 250. A power NFET 254 has a source coupled to 3.3-volt PCI pins A21, A27, A33, A39, A45, A53, B25, B31, B36, B41, B43, and B54 of connector 30. Power NFET 254 has a drain coupled to the 3.3-volt power rail 40. A resistor 256 is coupled between the gate bias signal on line 222 and a gate of power NFET 254. A power NFET 258 has a source coupled to +12-volt PCI pin A2 of connector 30. Power NFET 258 has a drain coupled to +12-volt power rail 42. A resistor 260 is coupled between the gate bias signal on line 222 and a gate of power NFET 258. A power NFET 262 has a source coupled to −12-volt power rail 44. Power NFET 262 has a drain coupled to −12-volt PCI pin B1 of connector 30. A resistor 264 is coupled between the gate bias signal on line 222 and a gate of power NFET 262. A resistor 266 is coupled between the −12-volt power rail 44 and the gate of power NFET 262.

In operation, Hot-Plug controller 201 controls the gate bias signal on line 222 via the $V_{GATE}$ signal. When PCI slot 200 is in the off state as controlled by Hot-Plug controller 201, the $V_{GATE}$ signal from Hot-Plug controller 201 is at a low logic level thereby providing a low logic level on the gate bias signal on line 222. In this case, power NFETs 224, 228, 250, 254, 258, and 262 are all off. Microprocessor 22 instructs Hot-Plug controller 201 to turn on power to PCI slot 200 by instructing Hot-Plug controller 201 to bring the $V_{GATE}$ signal to a high logic level. Typically, microprocessor 22 sets corresponding control inputs on lines 203 to command Hot-Plug controller 201 to power-on PCI slot 200. HotPlug controller 201 responds to the power-on command from microprocessor 22 and ramps up the voltage of the $V_{GATE}$ signal provided as the gate bias signal line 222. As the voltage of the gate bias signal on line 222 increases, power NFETs 250, 254, 258, and 262 turn on. In addition, either power NFET 224 or power NFET 228 turns on depending on the state of the sensing signal on line 202.

A 5-volt only PCI card 50 inserted into PCI connector 30 shorts converted sense pins A12 and B13 to ground which forces the sense signal on line 202 to ground. If the gate bias signal on line 222 provides a sufficient gate voltage to power NFETs 224 and 228 to cause NFETs 224 and 228 to reach saturation and the sense signal on line 202 is at a ground level, the output of inverter 206 at node 208 is floating. Assuming that there is no input current to inverter 214, the increased voltage of the gate bias signal on line 222 appears at the gate of power NFET 224. The increased voltage at the gate of power NFET 224 turns on NFET 224, which switches the 5 volts from 5-volt power rail 38 to node 226 to provide 5 volts to the voltage I/O pins A10, A16, A59, A66, A75, A84, B19, B59, B70, B79, and B88 of connector 30. With the input of inverter 214 high, its output at node 216 is pulled to a ground voltage level. Thus, the gate of power NFET 228 is also pulled to ground. With its gate at a ground level, power NFET 228 is off. In this way, the 3.3 volt supply of 3.3-volt power rail 40 is isolated from the voltage I/O pins of connector 30 when a 5-volt type PCI card is inserted into connector 30.

When a universal type PCI card is inserted into PCI connector 30, converted sense pins A12 and B13 are open, but pull up resistor 204 ensures that the sense signal on line 202 is pulled to the 3.3 volt level of 3.3-volt power rail 40. In this case, the output of inverter 206 pulls node 208 to ground, and the output of inverter 214 is floating at node 216. Thus, power NFET 228 is on, which switches the 3.3 volts from 3.3-volt power rail 40 to node 226 to provide 3.3 volts to voltage I/O pins A10, A16, A59, A66, A75, A84, B19, B59, B70, B79, and B88 of connector 30. With node 208 at a ground level, power NFET 224 is off which isolates the 5 volts of 5-volt power rail 38 from the voltage I/O pins of connector 30 when a universal type PCI card is inserted into connector 30.

Microprocessor 22 instructs Hot-Plug controller 201 to power-off PCI slot 200 with a power-off command provided on line 203. In response to the power-off command, Hot-Plug controller 201 ramps down the voltage of the $V_{GATE}$ signal, provided on line 222, as the gate bias signal, towards a ground voltage level, which turns off power NFETs 224,228, 250, 254,258, and 262.

Figure 5:
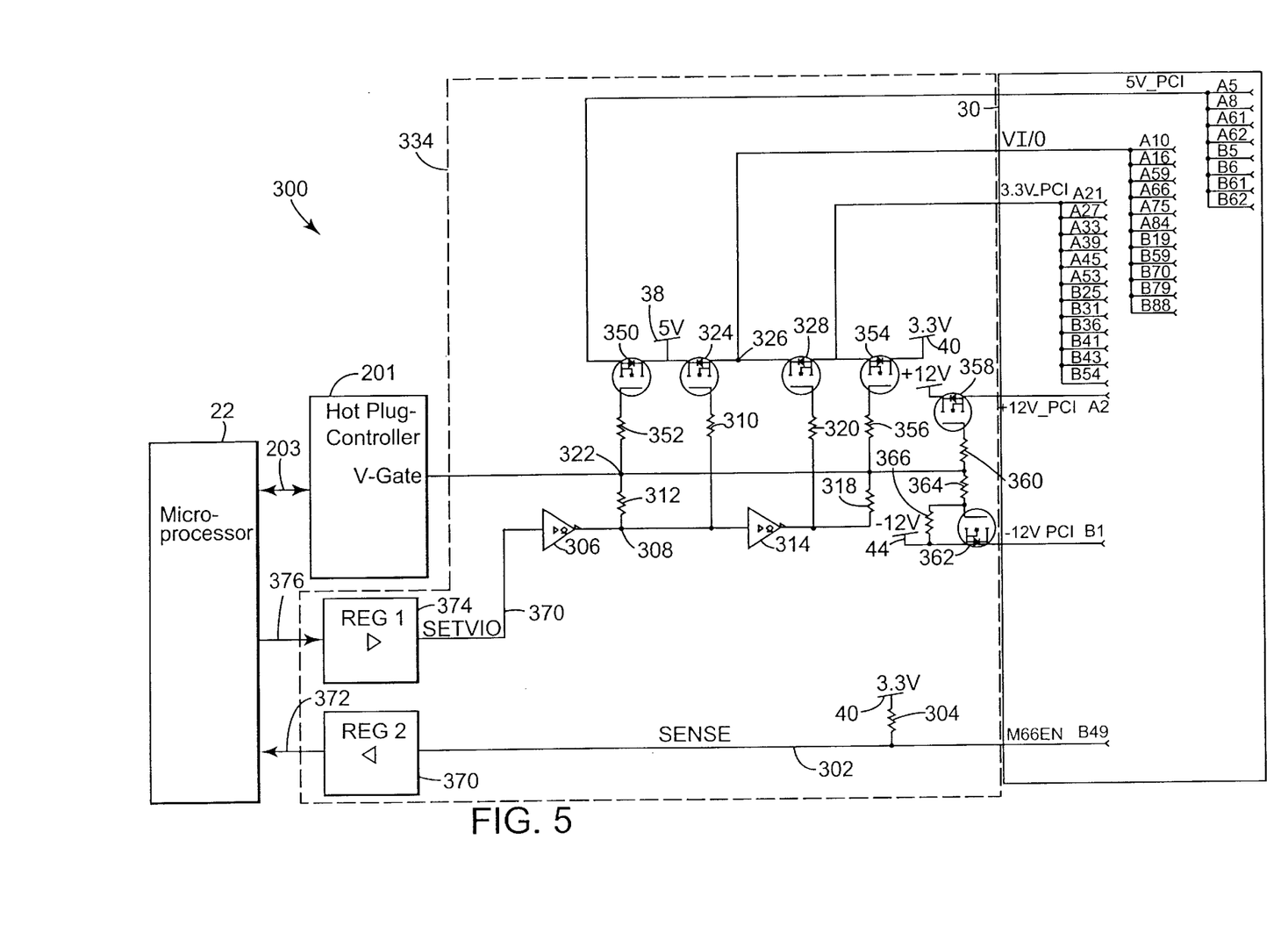
FIG. 5 is an alternative embodiment Hot-Plug slot according to the present invention which can be employed in the computer system of FIG. 1.

A PCI Hot-Plug slot according to the present invention is illustrated generally at 300 in FIG. 5. PCI Hot-Plug 300 includes sensing and switching circuitry 334 according to the present invention for operating in a PCI Hot-Plug environment. PCI Hot-Plug slot 300 also includes Hot-Plug controller 201. Hot-Plug controller 201 communicates with microprocessor 20 via lines 203 as described above in reference to FIG. 4. Sensing and switching circuitry 334 is similar to sensing and switching circuitry 234 of FIG. 4, except that an alternative sensing scheme is employed by sensing and switching circuitry 334 to determine whether to apply 5 volts or 3.3 volts to the voltage I/O pins of connector 30 based on whether a 5-volt only type PCI card operable up to 33 MHz or a universal type PCI card operable up to 66 MHz is inserted into PCI connector 30.

One problem with sensing and switching circuitry 134 of FIG. 3 and sensing and switching circuitry 234 of FIG. 4 is that there are a very small percentage of 5-volt type PCI only cards which have ground fingers connected to PCI pins A12, A13, B12, and B13 missing or left unconnected. These 5-volt only type PCI cards as they exist violate the PCI standard specification which requires that ground pins A12, A13, B12, and B13 are present and connected to ground. The sensing and switching circuitries 134 and 234 described above with reference to FIGS. 3 and 4, would misidentify such 5-volt only PCI cards having missing or open ground pins A12 and B13 as universal cards. As a result, the sensing and switching circuitries 134 and 234 would respectively have power NFET 128 and power NFET 228 turned on, which would provide 3.3 volts to the voltage I/O pins A10, A16, A59, A66, A75, A84, B19, B59, B70, B79, and B88 of connector 30. With a 5-volt only PCI card inserted in connector 30 and 3.3 volts being coupled to the voltage I/O pins of connector 30, the 5-volt power rail 38 and the 3.3-volt power rail 40 would be shorted together because 5-volt only PCI cards have the 5-volt PCI pins and the voltage I/O pins connected together. Therefore, if either sensing and switching circuitry 134 of FIG. 3 or sensing and switching circuitry 234 of FIG. 4 is employed, the user of such computer system must only use 5-volt only type PCI cards from vendors which properly ground pins A12, A13, B12, and B13. Such grounding is required by the PCI standard specification and most PCI cards available follow the PCI standard specification to properly ground pins A12, A13, B12, and B13. Sensing and switching circuitry 334 of FIG. 5 accommodates such non-compliant 5-volt only PCI cards by employing an alternative card-type identification scheme. The operation of sensing and switching circuitry 334 is based on the understanding that 66 MHz universal PCI cards require the voltage I/O pins of connector 30 to be at 3.3 volts in order to run at the full 66 MHz frequency. In addition, universal PCI cards can be operated with the voltage I/O pins at 5 volts, but only up to a 33 MHz frequency, even if the universal PCI cards are designed for 66 MHz operation. Also, 5-volt only PCI cards require that the voltage I/O pins of connector 30 be at 5 volts and can operate up to only 33 MHz. Thus, PCI cards designed for 66 MHz must have 3.3 volts at their voltage I/O pins to provide 3.3 volts to their I/O buffers to enable full frequency 66 MHz operation. 33 MHz universal type PCI cards can, and 5-volt only type PCI cards must operate with their voltage I/O pins of connector 30 at 5 volts.

Sensing and switching circuitry 334 employs a M66EN pin of a PCI card inserted into connector 30. 33 MHz PCI cards pull the M66EN pin to ground, and 66 MHz PCI cards leave the M66EN pin unconnected. The M66EN pin from the PCI card couples to pin B49 of connector 30. A sensing signal is provided on a line 302 from pin B49 of connector 30 which is based on the state of the M66EN pin of the inserted PCI card. A pull up resistor 304 is coupled between the sensing signal on line 302 and the 3.3-volt power rail 40. Thus, a 33 MHz PCI card inserted into PCI connector 30 pulls the sensing signal on line 302 to ground. A 66 MHz PCI card inserted into connector 30 causes the sensing signal on line 302 to be pulled to a 3.3 volt level via pull up resistor 304. The state of the sensing signal on line 302 is stored in a system readable register 370. Microprocessor 22 can read system readable register 370 via a line 372. A system writeable register 374 is written by microprocessor 22 via a line 376 to store a PCI card identification state. The output of system writeable register 374 is provided on a line 378 as a SETVIO signal to an inverter 306.

In one embodiment, inverter 306 comprises an open-collector/open-drain transistor, such as a small-signal NFET. The output of inverter 306 is coupled to a node 308. Node 308 is coupled to a first terminal of a resistor 310, a first terminal of a resistor 312, and an input of an inverter 314. Inverter 314 is preferably the same type of inverter as inverter 306, such as an open-collector/open-drain small-signal NFET inverter. The output inverter of 314 is coupled to a node 316. Node 316 is coupled to a first terminal of a resistor 318 and a first terminal of resistor 320. A gate bias signal on a line 322 is provided to a second terminal of resistor 312 and a second terminal of resistor 318. Hot-Plug controller 201 provides the $V_{GATE}$ signal on line 322 as the gate bias signal.

A power NFET 324 has a source coupled to a node 326, a drain coupled to the 5-volt power rail 38, and a gate coupled to a second terminal of resistor 310. A power NFET 328 has a source coupled to the 3.3-volt power rail 40, a drain coupled to node 326, and a gate coupled to a second terminal of resistor 320.

Node 326 is coupled to voltage I/O pins A10, A16, A59, A66, A75, A84, B19, B59, B70, B79, and B88 of connector 30 which supply power to I/O buffers in a PCI card inserted in PCI connector 30.

Sensing and switching circuitry 334 is similar to sensing and switching circuitry 234 in that the gate bias signal on line 322 is controlled by Hot-Plug controller 201 via the $V_{GATE}$ signal rather than being at a fixed voltage level.

The added circuitry controlled by Hot-Plug controller 201 via the $V_{GATE}$ signal is coupled as follows. A power NFET 350 has a source coupled to 5-volt PCI pins A5, A8, A61, A62, B5, B6, B61, and B62 of connector 30. Power NFET 350 has a drain coupled to the 5-volt power rail 38. A resistor 352 is coupled between the gate bias signal on line 322 and a gate of power NFET 350. A power NFET 354 has a source coupled to 3.3-volt PCI pins A21, A27, A33, A39, A45, A53, B25, B31, B36, B41, B43, and B54 of connector 33. Power NFET 354 has a drain coupled to the 3.3-volt power rail 40. A resistor 356 is coupled between the gate bias signal on line 322 and a gate of driver NFET 354. A power NFET 358 has a source coupled to the +12-volt PCI pin A2 of connector 30. Power NFET 358 has a drain coupled to the +12-volt power rail 42. A resistor 360 is coupled between the gate bias signal on line 322 and a gate of power NFET 358. A power NFET 362 has a source coupled to −12-volt power rail 44. Power NFET 362 has a drain coupled to −12-volt PCI pin B1 of connector 30. A resistor 364 is coupled between the gate bias signal on line 322 and a gate of power NFET 362. A resistor 366 is coupled between −12-volt power rail 44 and the gate of power NFET 362.

In operation, Hot-Plug controller 201 controls the gate bias signal on line 322 via the $V_{GATE}$ signal. When PCI slot 300 is in the off-state as controlled by Hot-Plug controller 201, the $V_{GATE}$ signal from Hot-Plug controller 201 is at a low logic level thereby providing a low logic level at the gate bias signal on line 322. In this case, power NFETs 324, 328, 350, 354, 358, and 362 are all off. Microprocessor 22 instructs Hot-Plug controller 201 to turn on power to PCI slot 300 by instructing Hot-Plug controller 201 to bring the $V_{GATE}$ signal to a high logic level. Typically, microprocessor 22 sets corresponding control inputs on lines 203 to command Hot-Plug controller 201 to power-on PCI slot 300. Hot-Plug controller 201 responds to the power-on command from microprocessor 22 and ramps up the voltage of the $V_{GATE}$ signal provided as the gate bias signal on line 322. As the voltage of the gate bias signal on line 322 increases, power NFETs 350, 354, 358, and 362 turn on. In addition, either power NFET 324 or power NFET 328 turns on depending on the state of the SETVIO signal on line 378 from system writable register 374. The state of the SETVIO signal on line 378 is based on the state of the M66EN signal from the PCI card inserted in PCI connector 30.

The M66EN signal from the PCI card inserted in PCI connector 30 is only valid if the PCI card is powered on. Therefore, the following sequence is an example of a sequence performed by microprocessor 22 to determine the correct setting for the voltage I/O pins A10, A16, A59, A66, A75, A84, B19, B59, B70, B79, and B88 of connector 30 as illustrated in the flow diagram of FIG. 6.

Figure 6:
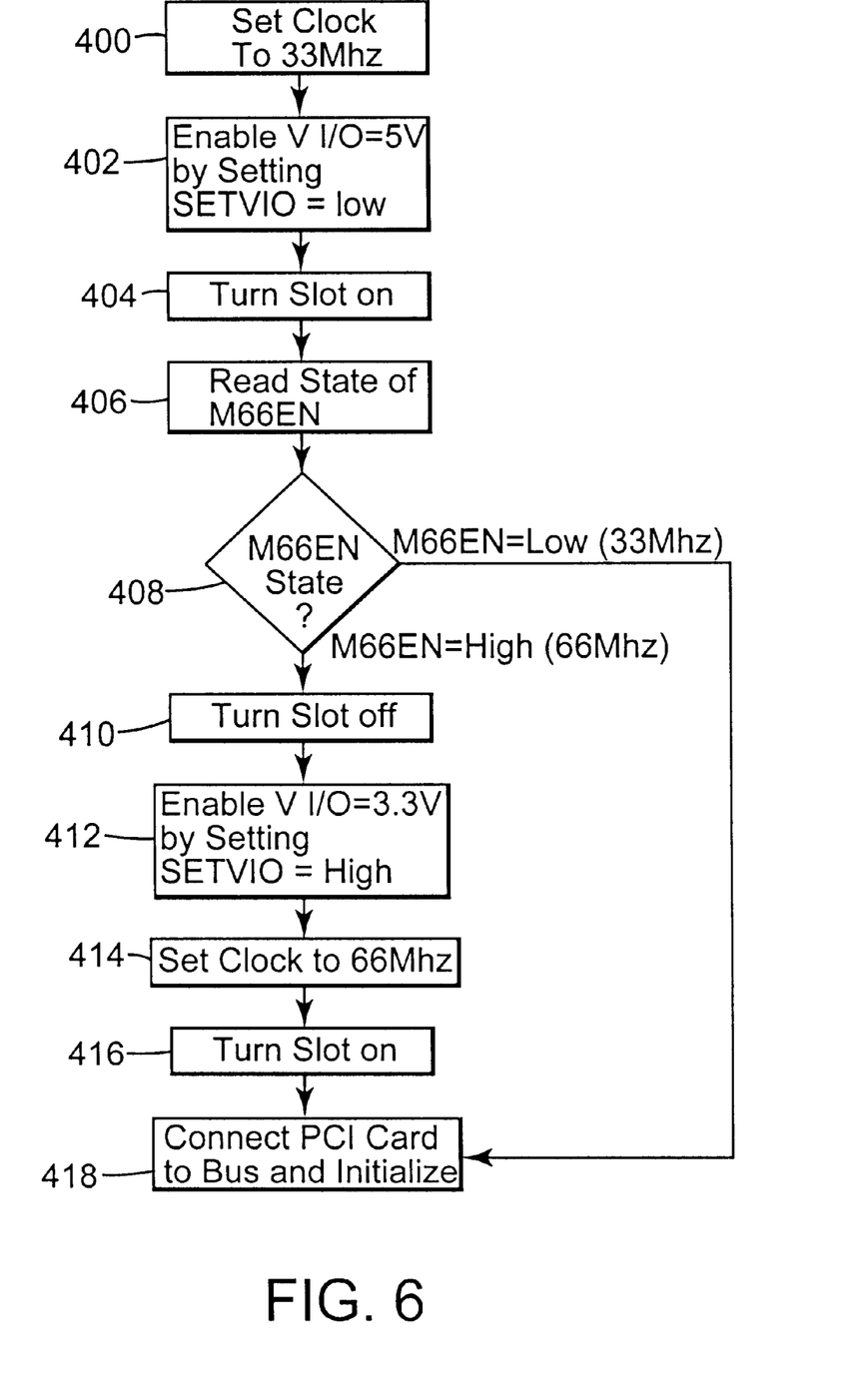
FIG. 6 is a flow diagram illustrating a sequence performed to determine a correct setting for voltage I/O pins of a connector of the Hot-Plug slot of FIG. 5.

As illustrated in FIG. 6, at block 400, microprocessor 22 sets the clock generator in PCI controller 32 to 33 MHz. As indicated at block 402, the voltage I/O pins of connector 30 are brought to 5 volts by setting the SETVIO signal on line 378 low via system writable register 374. At block 404, the power to PCI slot 300 is turned on via Hot-Plug controller 201 as commanded by microprocessor 22. At block 406, the state of M66EN is read via system readable register 370. At decision block 408, if M66EN is low, a 33 MHz PCI card is inserted in connector 30 and flow is passed to block 418.

If, at decision block 408, M66EN is high, a 66 MHz PCI card is inserted in connector 30 and flow is passed to block 410 where the power is turned off in PCI slot 300. After the power is turned off at block 410, the voltage I/O pins of connector 30 are brought to 3.3 volts at block 412 by setting the SETVIO signal on line 378 to a high logic level via system writable register 374. At block 414, microprocessor 20 controls PCI controller 32 to set the clock generator in PCI controller 32 to 66 MHz. At block 416, microprocessor 22 commands Hot-Plug controller 201 to turn on power to PCI slot 300. At block 418, the inserted PCI card is connected to the PCI bus and initialized.

If the gate bias signal on line 322 provides a sufficient gate voltage to power NFETs 324 and 328 to cause NFETs 324 and 328 to reach saturation and the SETVIO signal on line 378 provided by system writable register 374 is at a low logic level, the output of inverter 306 at node 308 is floating. Assuming there is no input current to inverter 314, the increased voltage of the gate bias signal on line 322 appears at the gate of power NFET 324. The increased voltage at the gate of power NFET 324 turns on NFET 324, which switches the 5 volts from 5-volt power rail 38 to node 326 to provide 5 volts to the voltage I/O pins A10, A16, A59, A66, A75, A84, B19, B59, B70, B79, and B88 of connector 30. With the input of inverter 314 high, its output at node 316 is pulled to a ground voltage level. Thus, the gate of power NFET 328 is pulled to ground. With its gate at a ground level, power NFET 328 is off. In this way, the 3.3 volts supply of 3.3-volt power rail 40 is isolated from the voltage I/O pins of connector 30 when a 33 MHz type PCI card is inserted into connector 30.

When the SETVIO signal on line 378 provided from system writable register 374 is a high logic level, the output of inverter 306 pulls node 308 to ground, and the output of inverter 314 is floating at node 316. Thus, power NFET 328 is on, which switches the 3.3 volts from 3.3-volt power rail 40 to node 326 to provide 3.3 volts to voltage I/O pins A10, A16, A59, A66, A75, A84, B19, B59, B70, B79, and B88 of connector 30. With node 308 at a ground level, power NFET 324 is off, which isolates the 5 volts of 5-volt power rail 38 from the voltage I/O pins of connector 30 when the 66 MHz type PCI card is inserted into connector 30.

Microprocessor 22 instructs Hot-Plug controller 201 to power off PCI slot 300 with a power-off command provided on line 203. In response to the power-off command, Hot-Plug controller 201 ramps down the voltage of the $V_{GATE}$ signal, provided on line 322 as the gate bias signal, towards a ground voltage level, which turns off power NFETs 324, 328, 350, 354, 358, and 362.

A computer system according to the present invention includes adaptable PCI slots which accommodate 5-volt only type PCI cards operating at 33 MHz and universal type PCI cards operating at 66 MHz to maximize I/O bandwidth potential of the computer system. The adaptable PCI slots according to the present invention permit the user of the computer system to customize every PCI slot of the computer system with either 5-volt only (33 MHz) PCI cards or universal (33 or 66 MHz) PCI cards. If desired, the computer system according to the present invention can be configured to maximize system performance by employing maximum frequency and maximum data width PCI cards in every PCI slot.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer system comprising:
   a first power rail having a first voltage level;
   a second power rail having a second voltage level;
   a PCI connector capable of receiving a first type PCI card having input/output (I/O) buffers operable at the first voltage level and capable of receiving a second type PCI card having adaptable I/O buffers operable at the first voltage level or the second voltage level, wherein the PCI connector includes voltage I/O pins for supplying power to the I/O buffers in a PCI card inserted in the PCI connector;
   sensing circuitry for sensing which type of PCI card is inserted in the PCI connector and providing a sense signal having a first state when the first type PCI card is inserted in the PCI connector and having a second state when the second type PCI card is inserted in the PCI connector; and
   switching circuitry coupled to the first and second power rails and responsive to the sense signal being at the first state to provide the first voltage level on the voltage I/O pins and responsive to the sense signal being at the second state to provide the second voltage level on the voltage I/O pins.

2. The computer system of claim 1 wherein the first type PCI card operates up to a first frequency and the second type PCI card operates up to the first frequency when its I/O buffers operate at the first voltage level and operates up to a second frequency which is higher than the first frequency when its I/O buffers operate at the second voltage level.

3. The computer system of claim 1 wherein the PCI connector comprises at least one sensing pin which is grounded when the first type PCI card is inserted in the PCI connector and is left open when the second type PCI card is inserted in the PCI connector.

4. The computer system of claim 3 wherein the sensing circuitry is coupled to the at least one sensing pin and is responsive to the at least one sensing pin being grounded to provide the sense signal at the first state and is responsive to the at least one sensing pin being left open to provide the sense signal at the second state.

5. The computer system of claim 1 wherein the PCI connector comprises a sensing pin which is grounded when the PCI card inserted in the PCI connector is capable of operating up to a first frequency and is left open when the PCI card inserted in the PCI connector is capable of operating up to a second frequency which is higher than the first frequency.

6. The computer system of claim 5 wherein the first type PCI card operates up to the first frequency and the second type PCI card operates up to the first frequency when its I/O buffers operate at the first voltage level and operates up to the second frequency when its I/O buffers operate at the second voltage level.

7. The computer system of claim 5 wherein the sensing circuitry is coupled to the sensing pin and is responsive to the sensing pin being grounded to provide the sense signal at the first state and is responsive to the sensing pin being left open to provide the sense signal at the second state.

8. The computer system of claim 5 wherein the switching circuitry comprises:
a system readable register for storing the state of the sense signal; and
a system writable register for providing a SETVIO signal for controlling the voltage level on the voltage I/O pins.

9. The computer system of claim 8 wherein the computer system further comprises:
a microprocessor for reading the system readable register and for writing the system writable register.

10. The computer system of claim 9 wherein the computer system further comprises a clock generator providing a clock signal which is controllable to have a frequency of either the first clock frequency or the second clock frequency, and wherein the microprocessor performs the following steps:
controlling the clock generator to provide the clock signal at the first clock frequency;
writing a first register state into the system writable register so that the system writable register provides the SETVIO signal at a first SETVIO state;
powering on the PCI connector;
reading the state of the system readable register;
if the state of the system readable register indicates that the sense signal is at the first state, connect the PCI card to the computer system and initialize the PCI card; and
if the state of the system readable register indicates that the sense signal is at the second state, perform the following steps:
power off the PCI connector;
write a second register state into the system writable register so that the system writable register provides the SETVIO signal at a second SETVIO state;
control the clock generator to provide the clock signal at the second clock frequency;
power on the PCI connector, and
connect the PCI card to the computer system and initialize the PCI card.

11. The computer system of claim 1 wherein the switching circuitry includes:

a first transistor coupled between the first power rail and the voltage I/O pins and having a gate;
a second transistor coupled between the second power rail and the voltage I/O pins and having a gate; and
control circuitry receiving the sense signal and controlling the gate of the first transistor and the gate of the second transistor.

12. The computer system of claim 11 further comprising:
a hot-plug controller for controlling the first and second power rails and providing a gate bias signal for controlling the power-on of the PCI connector, and wherein the control circuitry is responsive to the gate bias signal for controlling the gates of the first and second transistors.

13. The computer system of claim 12 wherein the gate bias signal is in at a first gate voltage level when the PCI connector is powered-off and is ramped up to a second gate voltage level to power-on the PCI connector, and wherein the control circuitry responds to the gate bias signal being at the second gate voltage level to cause either the first transistor or the second transistor to switch on depending on the state of the sense signal.

14. The computer system of claim 11 further comprising:
a third power rail having a third voltage level, wherein the control circuitry is coupled to the third power rail, and wherein the third voltage level controls the gates of the first and second transistors.

15. The computer system of claim 1 wherein the PCI connector includes a connector key portion corresponding to a first type card key portion, wherein the first type PCI card includes the first type card key portion and the second type PCI card includes the first type card key portion and a second type card key portion.

16. A method of connecting a PCI card to a computer system, the method comprising the steps of:
receiving a PCI card having input/output (I/O) buffers in a PCI connector having voltage I/O pins for supplying power to the I/O buffers;
sensing which type of PCI card is inserted in the PCI connector and providing a sense signal having a first state if the PCI card is a first type PCI card and having a second state if the PCI card is a second type PCI card, wherein the first type PCI card has input/output (I/O) buffers operable at a first voltage level and the second type PCI card has adaptable I/O buffers operable at the first voltage level or a second voltage level; and
providing the first voltage level on the voltage I/O pins in response to the sense signal being at the first state and providing the second voltage level on the voltage I/O pins in response to the sense signal being at the second state.

17. The method of claim 16 wherein the first type PCI card operates up to a first frequency and the second type PCI card operates up to the first frequency when its I/O buffers operate at the first voltage level and operates up to a second frequency which is higher than the first frequency when its I/O buffers operate at the second voltage level.

18. The method of claim 16 further comprising the steps of:
grounding at least one sensing pin of the PCI connector if the PCI card is the first type PCI card and leaving the at least one sensing pin open if the PCI card is the second type PCI card.

19. The method of claim 16 wherein the PCI connector comprises a sensing pin and the method further comprises the steps of:

grounding the sensing pin if the PCI card is capable of operating up to a first frequency and leaving the sensing pin open if the PCI card is capable of operating up to a second frequency which is higher than the first frequency.

20. The method of claim 19 wherein the first type PCI card operates up to the first frequency and the second type PCI card operates up to the first frequency when its I/O buffers operate at the first voltage level and operates up to the second frequency when its I/O buffers operate at the second voltage level.

21. The method of claim 16 further comprising the steps of:

storing the state of the sense signal; and providing a SETVIO signal for controlling the voltage level on the voltage I/O pins based on the stored state of the sense signal.

22. The method of claim 19 further comprising the steps of:

providing a clock signal at the first clock frequency;

writing a first register state into a system writable register so that the system writable register provides a SETVIO signal at a first SETVIO state;

powering on the PCI connector;

storing the state of the sense signal;

reading the stored state of the sense signal;

if the stored state of the sense signal indicates that the sense signal is at the first state, connect the PCI card to the computer system and initialize the PCI card; and if stored state of the sense signal indicates that the sense signal is at the second state, perform the following steps:

power off the PCI connector;

write a second register state into the system writable register so that the system writable register provides the SETVIO signal at a second SETVIO state;

provide the clock signal at the second clock frequency;

power on the PCI connector; and connect the PCI card to the computer system and initialize the PCI card.

* * * * *